(12) United States Patent
Svensson et al.

(10) Patent No.: US 10,792,741 B2
(45) Date of Patent: Oct. 6, 2020

(54) CIRCULAR SAW MOUNTING DEVICE

(71) Applicant: Södra Skogsägarna ekonomisk förening, Växjö (SE)

(72) Inventors: Jerker Svensson, Limmared (SE); Magnus Engholm, Värnamo (SE)

(73) Assignee: SÖDRA SKOGSÄGARNA EKONOMISK FÖRENING (SE)

( * ) Notice: Subject to any disclaimer, the term of this patent is extended or adjusted under 35 U.S.C. 154(b) by 83 days.

(21) Appl. No.: 16/095,997

(22) PCT Filed: Apr. 20, 2017

(86) PCT No.: PCT/EP2017/059332
§ 371 (c)(1),
(2) Date: Oct. 24, 2018

(87) PCT Pub. No.: WO2017/186551
PCT Pub. Date: Nov. 2, 2017

(65) Prior Publication Data
US 2019/0134726 A1    May 9, 2019

(30) Foreign Application Priority Data

Apr. 25, 2016   (SE) ...................................... 1650554

(51) Int. Cl.
*B23D 63/00* (2006.01)
*B23B 31/175* (2006.01)
(Continued)

(52) U.S. Cl.
CPC ...... *B23D 63/003* (2013.01); *B23B 31/16229* (2013.01); *B24D 5/16* (2013.01); *B24B 45/00* (2013.01)

(58) Field of Classification Search
CPC . B23B 31/16229; B23D 63/003; B24B 45/00; B24D 5/16
(Continued)

(56) References Cited

U.S. PATENT DOCUMENTS 803,604 A    11/1905 Krug
1,813,705 A   7/1931 Lewis
(Continued)

FOREIGN PATENT DOCUMENTS

EP      2567767     3/2013

OTHER PUBLICATIONS

International Search Report for corresponding international application No. PCT/EP2017/059332, dated Jun. 20, 2017.

*Primary Examiner* — Ghassem Alie
*Assistant Examiner* — Bharat C Patel
(74) *Attorney, Agent, or Firm* — Tarolli, Sundheim, Covell & Tummino LLP

(57) ABSTRACT

A circular saw mounting device which rotatably supports a saw blade in a grinding machine is disclosed. The mounting device comprises a base plate adapted for mounting in a grinding machine; a centering element comprising at least two engagement elements configured to be operated in a radial direction between a mounting position and a locking position. According to the invention the mounting device further comprises an actuator comprising a pin being configured to be operated in an axial direction and arranged to engage with pivot articulated couplings to each of the engagement elements to thereby transfer a radial displacement to the at least two engagement elements and to thereby operate the at least two engagement elements between the mounting position and the locking position.

9 Claims, 5 Drawing Sheets

(51) Int. Cl.
  *B24D 5/16* (2006.01)
  *B24B 45/00* (2006.01)

(58) Field of Classification Search
  USPC ............... 83/581, 581.1; 451/357–363, 342, 451/508–509, 541; 125/15
  See application file for complete search history.

(56) References Cited

U.S. PATENT DOCUMENTS

| | | | | |
|---|---|---|---|---|
| 3,085,813 | A | | 4/1963 | Sampson |
| 3,333,857 | A | * | 8/1967 | Lindgren ................. B24D 7/16 279/114 |
| 3,646,711 | A | * | 3/1972 | Oishi ..................... B24B 45/00 451/342 |
| 4,251,955 | A | * | 2/1981 | Shawke .................. B24D 5/16 451/342 |
| 4,339,893 | A | * | 7/1982 | Fournier ................. B24D 5/16 409/234 |
| 4,434,684 | A | * | 3/1984 | Nixon .................... B23B 31/10 279/111 |
| 4,598,916 | A | * | 7/1986 | McGehee ............ B23D 63/003 279/128 |
| 4,657,428 | A | * | 4/1987 | Wiley ................... B24B 45/006 403/359.3 |
| 4,706,386 | A | * | 11/1987 | Wiley ................... B23D 61/025 30/388 |
| 4,730,952 | A | * | 3/1988 | Wiley ................... B24B 45/006 30/388 |
| 4,787,147 | A | * | 11/1988 | Wiley ................... B24B 45/006 30/388 |
| 5,447,086 | A | * | 9/1995 | Wittmaier ................ B23C 5/26 83/666 |
| 5,580,301 | A | * | 12/1996 | Muller ..................... B24B 7/16 279/139 |
| 5,967,243 | A | * | 10/1999 | Jacobsson ............... B24B 23/02 173/216 |
| 6,701,629 | B2 | * | 3/2004 | Krondorfer ........... B23B 31/113 30/390 |
| 6,887,141 | B1 | * | 5/2005 | Lin ........................ B24B 23/00 451/356 |
| 6,925,718 | B2 | * | 8/2005 | Bartmann ............... B24B 23/02 30/276 |
| 7,588,484 | B2 | * | 9/2009 | Momosaki ........... B24B 45/006 451/359 |
| 8,167,689 | B2 | * | 5/2012 | Hofmann ............... B24B 23/02 451/359 |
| 8,485,937 | B2 | * | 7/2013 | Zhou ...................... B27B 5/32 475/337 |
| 8,997,618 | B1 | * | 4/2015 | Majcen ..................... F16D 1/08 30/390 |
| 9,073,127 | B2 | * | 7/2015 | Esenwein ............... B24B 55/00 |
| 9,327,550 | B2 | * | 5/2016 | Butler .................... B60B 7/0013 |
| 9,796,064 | B2 | * | 10/2017 | Holiness-Stalling ....................... B24B 41/04 |
| 2006/0258275 | A1 | * | 11/2006 | Chen ....................... B24D 5/16 451/520 |
| 2009/0075570 | A1 | * | 3/2009 | Levsen ............... B23B 31/1612 451/246 |
| 2014/0182873 | A1 | * | 7/2014 | Fankhauser ............ B24B 45/00 173/213 |

* cited by examiner

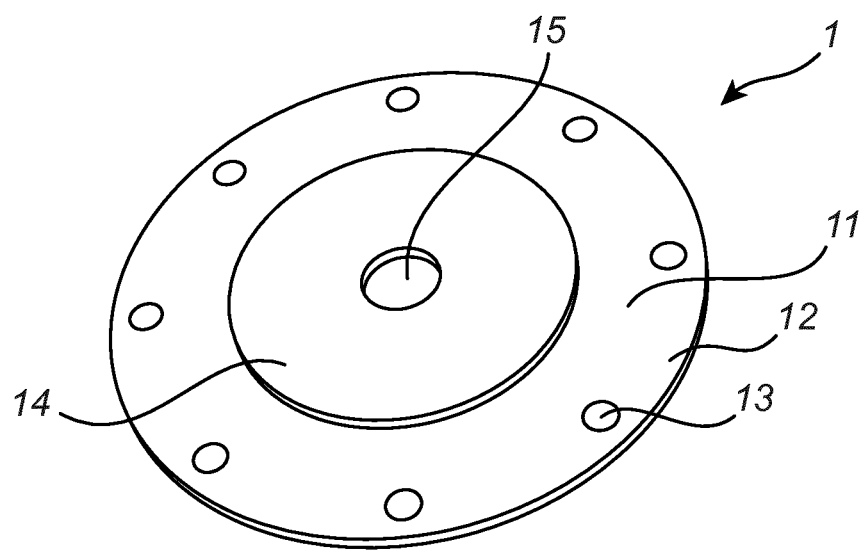
(prior art) Fig. 1
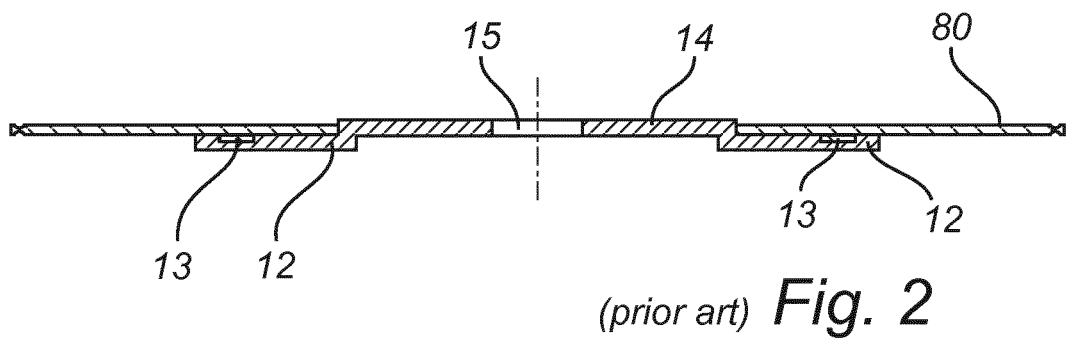
(prior art) Fig. 2

CIRCULAR SAW MOUNTING DEVICE

RELATED APPLICATIONS

The present invention is a U.S. National Stage under 35 USC 371 patent application, claiming priority to Serial No. PCT/EP2017/059332, filed on 20 Apr. 2017; which claims priority of SE 1650554-7, filed on 25 Apr. 2016, the entirety of both of which are incorporated herein by reference.

FIELD OF THE INVENTION

The present invention relates to a circular saw mounting device which rotatably supports the saw blade in a grinding machine.

BACKGROUND

Grinding machines for grinding the teeth of circular saw blades commonly include a power-driven grinding wheel and a mounting of the circular saw blade spaced for the grinding wheel which supports the saw during the grinding operation. In grinding machines, the saw mounting is such as to enable the saw blade to be rotated in increments, whereby to place successive teeth on the edge of the saw blade in a grinding position within the grinding machine, in which position the grinding operation takes place for each teeth, one after the other.

Grinding machines may accommodate saw blades of widely different diameters and sizes, and the saw blades may further have different inner bores. When grinding the teeth of a circular saw blade it is of outermost importance that the saw blade is accurately centered within the grinding machine, the smallest deviation in one direction may result in a grinding results which makes the saw blade unfit for further usage.

With the mounting devices available today this centering is not optimized properly. Some prior art devices require manual adjustment, which may cause uneven centering, see for example U.S. Pat. No. 4,434,684, while other mounting devices give rise to doubled or even tripled transfer of standard deviations, with a first standard deviation in the manufacturing of the saw blade and the formation of the inner bore diameter, a second standard deviation of a support ring in the mounting device, and a possible third standard deviation of the center bore of the mounting device, which center bore is then used for the mounting on a spindle within the grinding machine. An example of such a prior art mounting device is shown in FIG. 1, and with a mounted saw blade in FIG. 2.

Another mounting device is shown in US2009/0075570, which does not ensure equal clamping pressure of the jaws onto the saw blade, when the saw blade is mounted on the blade holder.

SUMMARY

An object of the invention is to provide an improved mounting device which results in the saw blade being accurately centrally positioned with respect to a grinding station in the grinding machine.

Another object of the invention is to provide an improved mounting device which provides a quick and accurately centrally mounting of the saw blade to the mounting device.

A third object of the invention is to provide an improved mounting device which enables automatic mounting of saw blade onto the mounting device as well as an automatic mounting of the mounting device with attached saw blade in a grinding machine.

According to a first aspect of the invention, these and other objects are achieved, in full or at least in part, by a circular saw mounting device which rotatably supports the saw blade in a grinding machine. According to this first aspect, the mounting device comprises a base plate adapted for mounting in a grinding machine; a centering element comprising at least two engagement elements configured to be operated in a radial direction between a mounting position and a locking position; and an actuator comprising a pin being configured to be operated in an axial direction and arranged to engage with pivot articulated couplings to each of the engagement elements to thereby transfer a radial displacement to the at least two engagement elements and to thereby operate the at least two engagement elements between the mounting position and the locking position.

With such pivot articulated coupling arrangement, the movement of the pin will provide equalized radial movement for all and every engagement element in both radial directions between a mounting position (M) and a locking position (L), and accordingly each engagement element will engage the saw blade with equal pressure from all the engagement elements. This will result in an improved and more accurate centering of the saw blade.

According to one embodiment, the pin is related to each of the at least two engagement elements by a shoulder arranged on the pin, a transmission cross in engagement with the shoulder, which transmission cross is coupled via at least two articulated couplings, at least one for each engagement element, to at least two pivot brackets, at least one for each engagement element. The at least two pivot brackets are fastened to the at least two engagement elements, preferably one pivot bracket per engagement element. Further in this embodiment linear guideways may be arranged between the engagement elements and a support surface. Such a support surface may in one embodiment comprise a circular disc rotatably arranged together with the at least two engagement elements.

According to another embodiment, the centering element comprises at least three engagement elements.

In yet another embodiment, the pin is spring-loaded by an elastic means towards a resting position in which the at least two engagement elements are set to the locking position.

In a further embodiment, the mounting device on a first surface thereof has a mounting bracket which is arranged for mounting the mounting device in a grinding machine. This mounting bracket may be configured for mounting and locking of the mounting device within the grinding machine. In one embodiment the mounting bracket is a sleeve coupling.

In one embodiment each of the at least two engagement elements are formed as segments of a circle, wherein a peripheral outer edge portion of each segment forms an engagement surface adapted to radially engage an inner edge of a central bore of a saw blade. The peripheral outer edge portion may comprise a surface with an embossed work, but may also comprise a smooth surface.

In one embodiment, the mounting device has, on a first surface thereof, a centrally arranged dowel having a through axially extending bore, and wherein the pin is coaxially received and axially operable inside said bore.

In another embodiment, the mounting device, on a second surface opposite the first surface, comprises a cap, said cap being arranged to extend coaxially with the pin and circumferentially surround said pin.

In yet another embodiment, the pin is arranged to extend from within the bore of the dowel to the second surface of the mounting device while being axially guided by the bore of the dowel and by a centrally arranged through-hole in a surface of the cap facing the second surface of the mounting device.

In a further embodiment an inner surface of the cap provides an abutment for the elastic means.

In one embodiment, the base plate on the second surface of the mounting device has, in a peripheral outer section, an engagement surface adapted to engage a side surface of a saw blade.

Other objectives, features and advantages of the present invention will appear from the following detailed disclosure, from the attached claims, as well as from the drawings. It is noted that the invention relates to all possible combinations of features.

DEFINITIONS

The expression "the pin is arranged to engage with pivot articulated couplings to each of the engagement elements" means that the length and angle of the pivot articulated couplings will define and limit the specific radial displacement of the engagement elements, and further all and every engagement elements will travel the same distance in both directions between a mounting position and a locking position.

The expression "directly or indirectly" in the phrase "the pin is arranged to engage directly or indirectly with pivot articulated couplings to each of the engagement elements" means that the couplings may be coupled directly in the pin and directly in the engagement elements, or may be arranged with intermediate parts between the pin and the pivot articulated couplings and between the pivot articulated couplings and the engagement elements, such as a shoulder arranged on the pin, a transmission cross, and pivot brackets, which all together link the pin with the engagement elements, and translate the axial movement of the pin into radial movements of the engagement elements.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of that term are not intended to exclude other additives, components, integers or steps.

BRIEF DESCRIPTION OF THE DRAWINGS

The invention will be described in more detail with reference to the appended schematic drawings, which show an example of a presently preferred embodiment of the invention.

FIG. 1 is a front view showing a mounting device according to prior art.

FIG. 2 is a cross-sectional view showing the mounting device of FIG. 1 with a saw blade mounted thereon.

DETAILED DESCRIPTION

Figure 3:
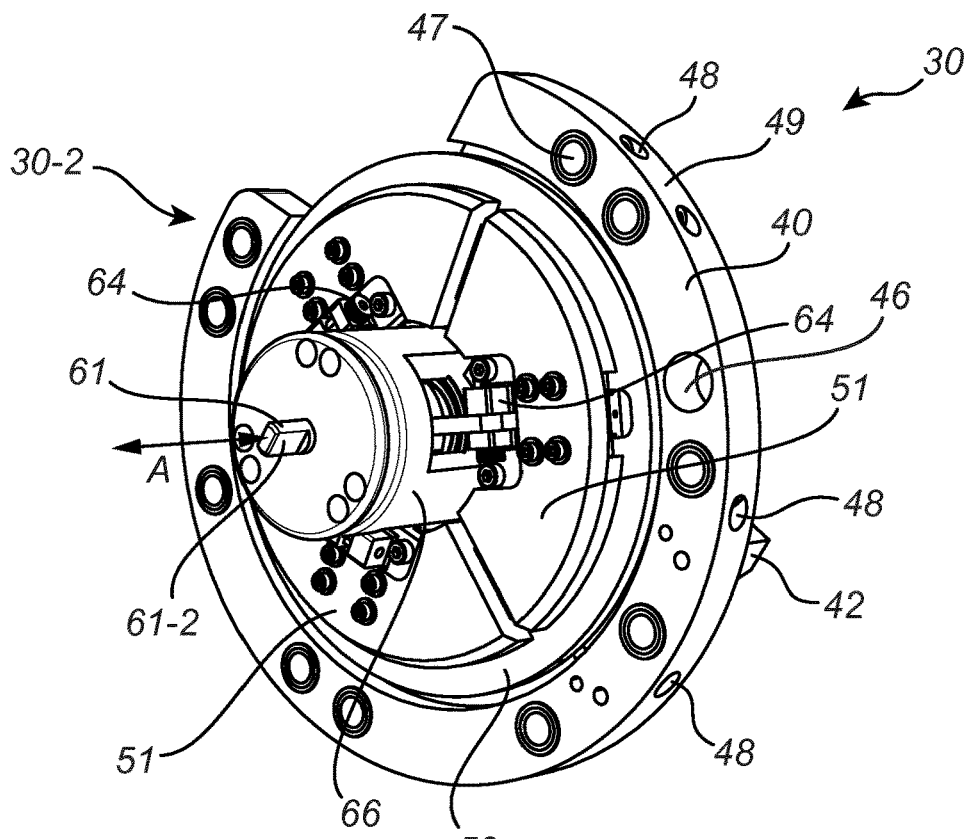
FIG. 3 is a perspective front view showing a mounting device according to one embodiment of the present invention.

The present invention will now be described more fully hereinafter with reference to the accompanying drawings, in which a currently preferred embodiment of the invention is shown. The present invention may, however, be embodied in many different forms and should not be construed as limited to the embodiment set forth herein; rather, this embodiment is provided for thoroughness and completeness, and to fully convey the scope of the invention to the skilled addressee. Like reference characters refer to like elements throughout.

FIG. 1 and FIG. 2 shows a mounting device 1 according to prior art. The mounting device according to prior art comprises a disk 11 having an outermost collar 12 with magnets 13 peripherally arranged in recesses. A hub 14 is arranged centrally in the disc 11, which hub 14 has an outermost diameter approximately corresponding to a bore diameter of a circular saw blade for mounting. The mounting device further has a bore 15 arranged within the center of the disc 11. This bore 15 is used for the assembling of the mounting device with the saw blade 80 within a grinding machine. As disclosed above such a mounting device give rise to tripled transfer of standard deviations, with a first standard deviation in the manufacturing of the saw blade 80 and the formation of the inner bore thereof, a second standard deviation of the hub 14 of the mounting device 1, and a third standard deviation of the center bore 15 in the mounting device, which center bore is then used for the mounting on a spindle within the grinding machine.

FIGS. 3-7 show a mounting device 30 according to one embodiment of the present invention. The mounting device 30 comprises a base plate 40, a centering element 50, and an actuator 60.

Figure 4:
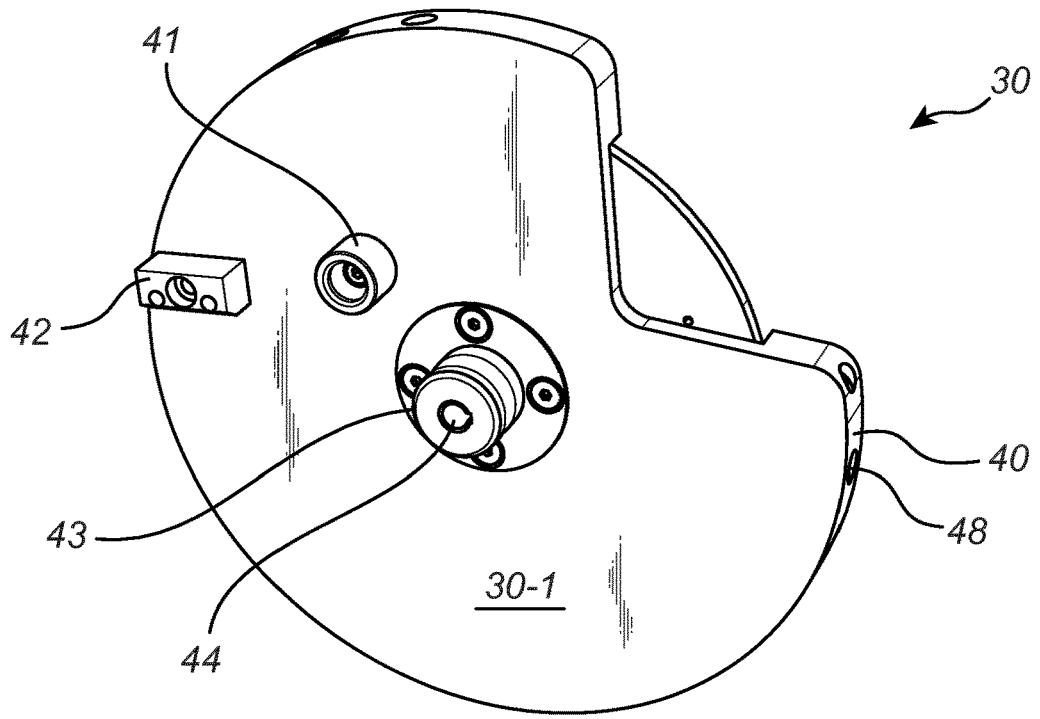
FIG. 4 is a perspective back view of the mounting device of FIG. 3 seen from behind.

In FIG. 4, a first surface 30-1 of the mounting device 30 is shown. This is the surface which faces and interacts with a mount within a grinding machine. In this embodiment a mounting bracket 41 is arranged for interaction with the mount within the grinding machine and in particular for locking the mounting device 30 with the saw blade 80 within the grinding machine. Further on this first surface 30-1, a stop shoulder 42 may be arranged. This stop shoulder 42 may interact with a corresponding recess in the mount within a grinding machine to prevent the base plate 40 from rotating within the grinding machine. Also on this first surface 30-1 of the mounting device 30, a centrally arranged dowel 43 may be arranged. The dowel 43 may be used for securing and/or locking the mounting device 30 during the loading and/or unloading of a saw blade onto and off the mounting device 30. The dowel 43 may, as shown in this embodiment be screw fasten to the base plate 40. In the shown embodiment the dowel 43 has a through axially extending bore 44, which is more evident from FIGS. 5 and 6.

In FIG. 3, a second surface 30-2 of the mounting device 30 is shown. This is the surface which faces and interacts with a saw blade 80 for securing and mounting the saw blade 80 onto the mounting device 30, and it is on this surface the centering element 50 is arranged.

In the shown embodiment, the centering element 50 comprises three engagement elements 51, three linear guideways 52, and a rotating disc 53. The engagement elements 51 are fasten to one linear guideways 52 each, and, in this embodiment, the linear guideways 52 are arranged within recesses 54 in the rotation disc 53. However, the linear guideways may not necessarily be arranged in recesses, instead the rotation disc 53 may be without any recesses, and instead have a uniform flat surface upon which the linear guideways are arranged.

Figure 5:
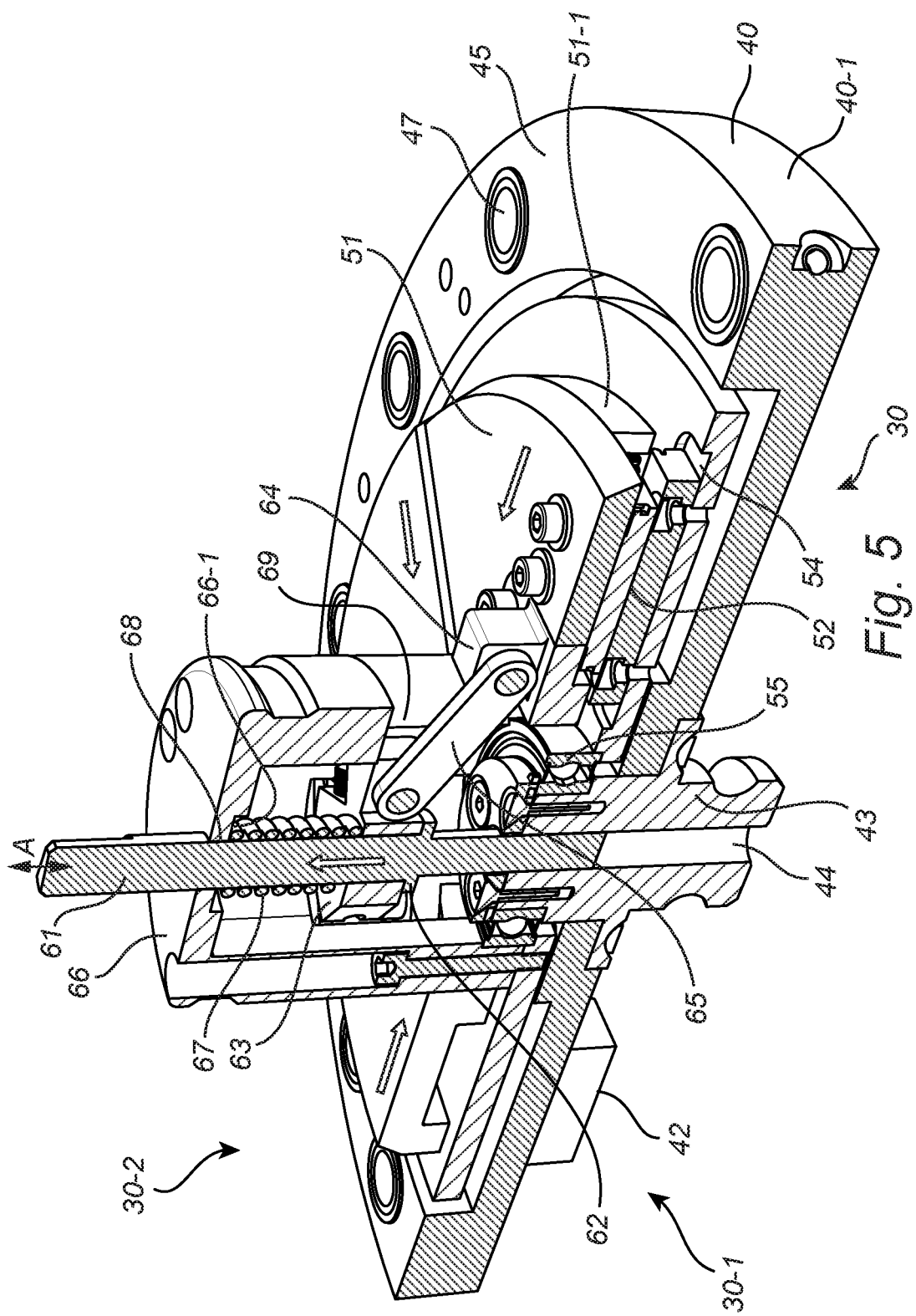
FIG. 5 is a partial cross-sectional view of the mounting device of FIG. 3 with the engagement elements in a mounting position.
Figure 6:
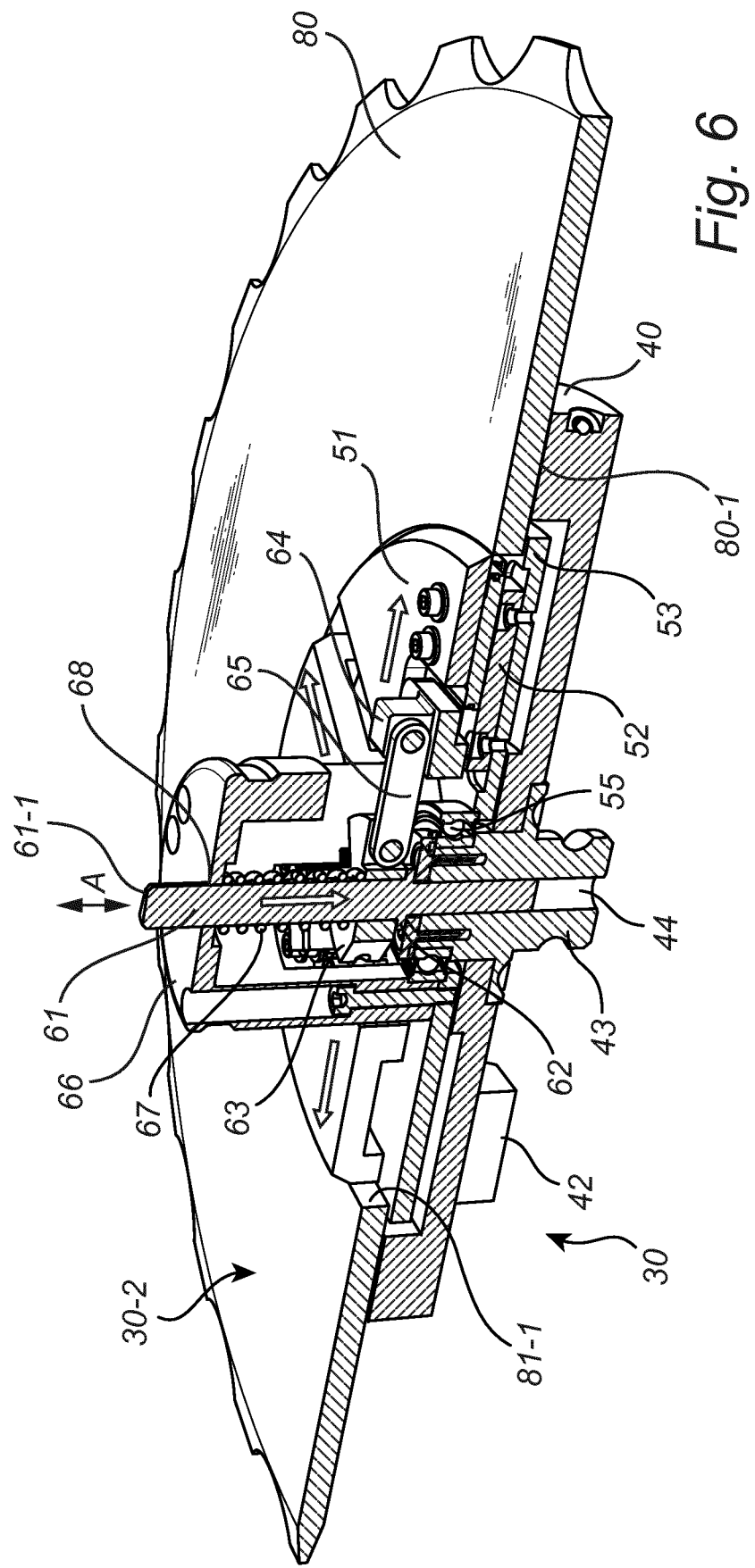
FIG. 6 is a partial cross-sectional view of the mounting device of FIG. 3 together with a saw blade, and with the engagement elements in a locking position.
Figure 7:
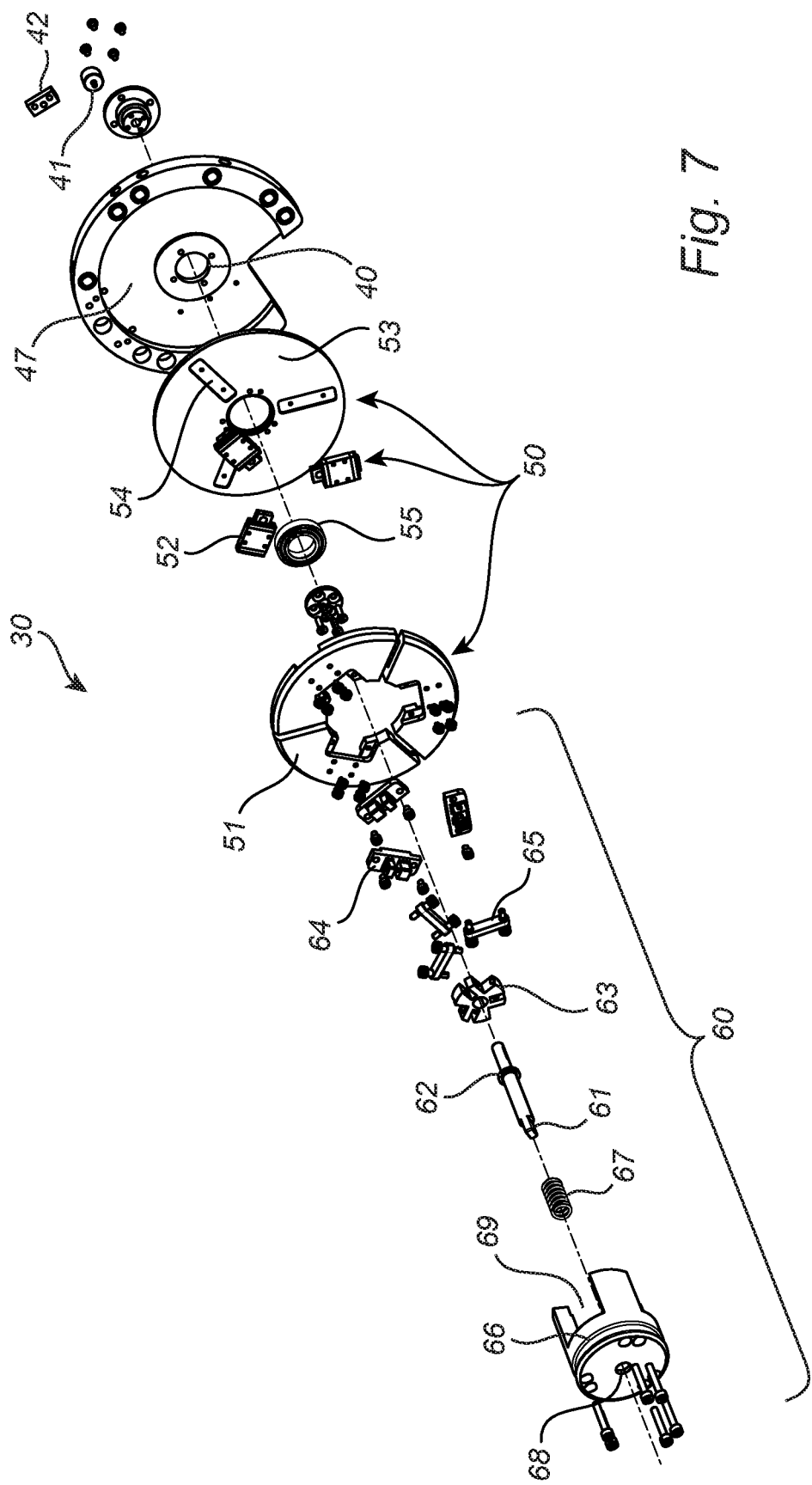
FIG. 7 is an exploded view showing the different parts of the mounting device of FIG. 3.

In the shown embodiment, and more particular as shown in FIGS. 5, 6 and 7, the centering element 50 is rotatably arranged in relation to the base plate 40 with bearings 55.

Further, the actuator 60 comprises a pin 61, which is configured to be operated in an axial direction A, and in the shown embodiment the pin 61 is a locating pin 61 comprising a shoulder 62. Further, in the shown embodiment the pin 61 is coaxially received in the through axially extending bore 44 in the dowel 43.

The actuator 60, according to this embodiment, further comprises a transmission cross 63 arranged in cooperation with the shoulder 62 of the pin 61. The transmission cross 63 is further coupled with three pivot brackets 64 with articulated couplings 65, and the three pivot brackets 64 are fastened to one engagement element 51 each.

Even further, the actuator 60, within the shown embodiment, comprises a cap 66, which is arranged on the second surface 30-2 of the mounting device 30 and arranged to extend coaxially with the pin 61 and circumferentially surround the pin 61 and also the transmission cross 63. The actuator 60 further comprises an elastic means 67, which elastic means 67 is arranged with springload between the transmission cross 63 and an inner surface 66-1 of the cap 66. Thus, this inner surface 66-1 of the cap 66 forms an abutment surface for the elastic means 67 in one end, while one surface of the transmission cross 63 forms an abutment surface for an opposite end of the elastic means 67. The cap 66 further has apertures 69 evenly arranged around the cap 66, which apertures 69 are arranged to allow movement of the articulated couplings 65 linking the transmission cross 63 arranged on the inside the cap 66 and the pivot brackets 64 arranged outside the cap 66.

Even further, in the shown embodiment, the cap 66 has a centrally arranged through-hole 68 in a surface of the cap 66 facing the second surface 30-2 of the mounting device 30. The pin 61 is, in the shown embodiment, arranged to extend from within the bore 44 and out through the centrally arranged through-hole 68 to the second surface 30-2 of the mounting device 30 being axially guided by the bore 44 in the dowel 43 and by the centrally arranged through-hole 68.

In a resting position, the pin 61 is spring-loaded by the elastic means 67 such that the engagement elements 51 are set to a locking position L, as shown in FIG. 6.

When loading a saw blade 80 onto the mounting device 30, the actuator 60 is activated by applying, through the bore 44 of the dowel 43, a pressure on the pin 61 to force the pin 61 in an axial direction A against the springload and towards the second surface 30-2 of the mounting device 30. The axial movement of the pin 61, via the shoulder 62, the transmission cross 63, the articulated couplings 65 and the pivot brackets 64, then brings the engagement elements 51 to slide radially inwards on the linear guideways 52 to a mounting position M, which position is shown in FIG. 5. A saw blade is thereafter loaded onto the mounting device 30 on the second surface 30-2 of the mounting device 30, placing the saw blade 80 to rest upon an engagement surface 45 adapted to engage a part of a side surface 80-1 of the saw blade 80. The cap 66 and the engagement elements 51 are positioned within a central bore 81 of the saw blade 80. The pressure applied on the pin 61 is relieved, and the spring-load urges the pin in the opposite axial direction towards the first surface 30-1, and this axial movement brings the engagement elements back towards the locking position L, pressing a peripheral outer edge portion 51-1 of each engagement element 51 to engage and press against an inner edge 81-1 of a bore 81 of the saw blade 80, thereby locking the saw blade 80 onto the mounting device 30.

When finalizing the loading of the saw blade 80 onto the mounting device 30, the mounting device 30 carrying the saw blade 80 is mounted into the grinding machine via the mounting bracket 41, and the stop shoulder 42 is positioned in a corresponding recess in the mount of the grinding machine, and the same is true for the dowel 43.

The mounting device 30 may be used for manually loading the saw blade 80 onto the mounting device 30, and then manually mounting of the mounting device 30 with the saw blade 80 into a grinding machine. However, the mounting device 30 of the present invention is especially advantageous in that it may be operated by automatic robot handling, both for the part of loading/unloading of the saw blade 80 onto/off the mounting device 30, but also the handling of mounting/unmounting the mounting device 30 with the saw blade 80 in and/or out of the grinding machine.

With an automatic robot handling, the cup 66 may be the gripping position for a robot grip. When loading or unloading the saw blade 80 onto or off the mounting device 30, the mounting device 30 may rest upon a flat surface with an opening for receiving the dowel 43, the mounting bracket 41 and the stop shoulder and a locking arrangement to engage the dowel 43 on the first surface 30-1 to secure the mounting device onto such a flat surface.

When the mounting device 30 with the saw blade 80 is mounted into a grinding machine, the mounting bracket 41 may be used to lock and secure the mounting device with the saw blade within the grinding machine. The dowel 43 and the stop shoulder 42 rest in corresponding recesses in the mount within the grinding machine.

The shown embodiment further has recesses 46 (see FIG. 3) arranged on the engagement surface 45 of the base plate 40. Within these recesses magnets 47 are arranged and fastened. These magnets 47 are arranged to slow down the rotation of the saw blade 80 within the grinding machine. However, these magnets 47 are also part of the prior art solution, as shown in FIG. 1 with reference number 13. The magnets 47 may be screw fastened through recesses 48 arranged in the peripheral outer edge 40-1 of the base plate 40, but other fastening methods are also possible.

When the mounting device 30 and a thereon loaded saw blade 80 is mounted within a grinding machine, the base plate 40 together with the dowel 43 and the pin 61 has a fixed position not rotating within the grinding machine. When the successive teeth 82 on the edge of the saw blade 80 are placed one after the other in the grinding position within the grinding machine, the saw blade 80, the engagement elements 51, the rotation disc 53, the linear guideways 52, the pivot brackets 64, the articulated couplings 65, the transmission cross 63, the elastic means 67, and the cap 66 are all rotated together.

With the claimed mounting device 30, the centering of the saw blade 80 will quickly and accurately be accomplished, as the engagement elements 51 are equally radially displaced by the actuator 60. Accordingly, any standard deviations present within the central bore 81 of the saw blade 80 will be compensated for within the mounting device 30 according to the present invention.

Even further, the way a saw blade 80 is loaded and mounted upon the mounting device 30, and is kept locked thereon, enables automatic mounting of saw blade 80 onto the mounting device 30 and automatic mounting of saw blade 80 and mounting device 30 into an out of the grinding machine.

In one embodiment, the pin 61 may have an end part 61-1, extending out through the trough-hole 68 to the second side 30-2 and having a form which is configured to interact with a part of a robot head of an automatic mounting station to ensure proper automatic mounting within a grinding machine. In the shown embodiment, the end part 61-1 of the pin has two parallel rectangular surfaces 61-2, which surfaces may interact with corresponding surfaces of a robot head of an automatic mounting station.

The skilled person realises that a number of modifications of the embodiment described herein are possible without departing from the scope of the invention, which is defined in the appended claims.

For instance, a centering element 50 having three engagement elements is shown, but the centering element 50 may comprise only two engagement elements 51, two linear guideways 52 and a rotating disc 53, but also four or more engagement elements 51, corresponding number of linear guideways 52, and a rotating disc 53.

The invention claimed is:

1. A circular saw mounting device which rotatably supports a saw blade in a grinding machine, the circular saw mounting device comprising:
   a base plate that mounts to the grinding machine;
   a centering element that rotates with respect to the base plate via bearings, the centering element comprising at least two engagement elements slidably moveable in a radial direction between a mounting position and a locking position;
   an actuator that includes a pin that when actuated slidably moves in an axial direction;
   at least two articulated couplings coupled to each of the at least two engagement elements at one end and to the pin at an opposite end, the at least two articulated couplings transferring a radial displacement to the at least two engagement elements and to at least two pivot brackets and a transmission cross to slidably move the at least two engagement elements between the mounting position and the locking position; and
   a mounting bracket disposed on a first surface of the circular saw mounting device to mount and lock the circular saw mounting device to the grinding machine.

2. The circular saw mounting device according to claim 1, wherein the centering element comprises at least three engagement elements.

3. The circular saw mounting device according to claim 1, wherein the pin is spring-loaded by an elastic means towards a resting position in which the at least two engagement elements are set to the locking position.

4. The circular saw mounting device according to claim 3, wherein the circular saw mounting device has, on a first surface thereof, a centrally arranged dowel having a through axially extending bore, and wherein the pin is coaxially received and axially operable inside said bore.

5. The circular saw mounting device according to claim 4, wherein the circular saw mounting device, on a second surface opposite the first surface, comprises a cap, the cap being arranged to extend coaxially with the pin and circumferentially surround the pin.

6. The circular saw mounting device according to claim 5, wherein the pin is arranged to extend from within the bore of the dowel to the second surface of the circular saw mounting device while being axially guided by the bore of the dowel and by a centrally arranged through-hole in a surface of the cap facing the second surface of the mounting device.

7. The circular saw mounting device according to claim 6, wherein an inner surface of the cap provides an abutment for the elastic means.

8. The circular saw mounting device according to claim 1, wherein each of the at least two engagement elements are formed as segments of a circle, wherein a peripheral outer edge portion of each segment forms an engagement surface adapted to radially engage an inner edge of a central bore of the saw blade.

9. The circular saw mounting device according to claim 1, wherein the base plate on a second surface of the mounting device has, in a peripheral outer section, an engagement surface adapted to engage a side surface of a saw blade.

* * * * *